(12) United States Patent
Onizuka et al.

(10) Patent No.: US 11,370,893 B2
(45) Date of Patent: Jun. 28, 2022

(54) COMPOSITE MATERIAL, PREPREG, CARBON-FIBER-REINFORCED MOLDED BODY, AND METHOD FOR MANUFACTURING COMPOSITE MATERIAL

(71) Applicant: NITTA CORPORATION, Osaka (JP)

(72) Inventors: Maki Onizuka, Osaka (JP); Takuji Komukai, Osaka (JP)

(73) Assignee: NITTA CORPORATION, Osaka (JP)

( * ) Notice: Subject to any disclaimer, the term of this patent is extended or adjusted under 35 U.S.C. 154(b) by 74 days.

(21) Appl. No.: 16/651,590

(22) PCT Filed: Sep. 21, 2018

(86) PCT No.: PCT/JP2018/035193
§ 371 (c)(1),
(2) Date: Mar. 27, 2020

(87) PCT Pub. No.: WO2019/065535
PCT Pub. Date: Apr. 4, 2019

(65) Prior Publication Data
US 2020/0255613 A1    Aug. 13, 2020

(30) Foreign Application Priority Data
Sep. 27, 2017 (JP) .............................. JP2017-185925

(51) Int. Cl.
*C08J 5/24* (2006.01)
*C08K 3/04* (2006.01)
(Continued)

(52) U.S. Cl.
CPC ................ *C08J 5/24* (2013.01); *C08J 5/042* (2013.01); *C08K 3/041* (2017.05); *D06M 11/74* (2013.01); *D06M 2101/40* (2013.01)

(58) Field of Classification Search
CPC ...... C01B 32/158; D04H 1/4242; D02G 3/16; D01F 11/25; C08G 2650/56;
(Continued)

(56) References Cited

U.S. PATENT DOCUMENTS

2011/0200755 A1* 8/2011 Mezzo ................. C09D 171/00
427/331

FOREIGN PATENT DOCUMENTS

JP    2010-042942 A    2/2010
JP    2011-528056 A   11/2011
(Continued)

OTHER PUBLICATIONS

International Search Report issued in corresponding International Application No. PCT/JP2018/035193 dated Dec. 18, 2018 (5 pages).
(Continued)

*Primary Examiner* — Camie S Thompson
(74) *Attorney, Agent, or Firm* — Osha Bergman Watanabe & Burton LLP (57) ABSTRACT

Provided are a composite material that adequately obtains the effect of carbon nanotubes, a prepreg in which the composite material is used, a carbon-fiber-reinforced molded article having greater resistance to the progression of the interlayer peeling crack, and a method for manufacturing the composite material. A composite material includes a carbon fiber bundle in which a plurality of continuous carbon fibers are arranged, carbon nanotubes adhering to respective surfaces of the carbon fibers, and a plurality of fixing resin parts partly fixing the carbon nanotubes on the surfaces of the carbon fibers, where the fixing resin parts cover 7% or more and 30% or less of the surfaces of the carbon fibers to which the carbon nanotubes adhere.

6 Claims, 8 Drawing Sheets

(51) Int. Cl.
*C08J 5/04* (2006.01)
*D06M 11/74* (2006.01)
*D06M 101/40* (2006.01)

(58) Field of Classification Search
CPC ......... Y10T 428/292; Y10T 428/24993; Y10T 428/2924; D06M 11/74; D06M 2101/40; C08J 5/06; C08J 5/24; C08J 5/248; B82Y 30/00; C08K 3/04; C08K 3/041; C08L 63/00; C09D 163/00; C09D 171/00
USPC ........... 428/368, 370, 296.7; 427/384, 385.5, 427/389.9; 977/742
See application file for complete search history.

(56) References Cited

FOREIGN PATENT DOCUMENTS

| | | |
|---|---|---|
| JP | 2013-509503 A | 3/2013 |
| JP | 2013-076198 A | 4/2013 |
| JP | 2015-531425 A | 11/2015 |
| WO | 2016/159121 A1 | 10/2016 |

OTHER PUBLICATIONS

Written Opinion of the International Searching Authority issued in corresponding International Application No. PCT/JP2018/035193 dated Dec. 18, 2018 (9 pages).

* cited by examiner

COMPOSITE MATERIAL, PREPREG, CARBON-FIBER-REINFORCED MOLDED BODY, AND METHOD FOR MANUFACTURING COMPOSITE MATERIAL

TECHNICAL FIELD

The present invention relates to a composite material, a prepreg, a carbon-fiber-reinforced molded article, and a method for manufacturing the composite material.

BACKGROUND ART

A carbon fiber bundle in which continuous carbon fibers on the order of several thousands to several tens of thousands are bound excellent characteristics such as low density, high specific degree of strength, high specific degree of elasticity, and the like. A prepreg obtained by impregnating such a carbon fiber bundle with resin is expected to meet demands for use in applications requiring high performance (aerospace applications, etc.).

A CNT/carbon fiber composite material has been proposed as reinforced fiber, which has a structure in which a CNT network thin film is formed by entanglement of a plurality of carbon nanotubes (hereinafter also referred to as CNT) upon the surface of carbon fibers (for example, Patent Literature 1). Such a composite material is useful as a base material of a carbon-fiber-reinforced molded body such as a carbon fiber reinforced plastic (hereinafter also referred to as CFRP).

CITATION LIST

Patent Literature

Patent Literature 1: Japanese Patent Application Laid-Open No. 2013-76198

SUMMARY OF INVENTION

Technical Problem

In Patent Literature 1, carbon fibers are immersed in a dispersion containing CNTs, which are subjected to application of energy such as vibrations, optical radiation, heat, etc., and thereby a CNT network is formed on the surface of the carbon fibers. When the effects of the CNTs can be fully exhibited, it is made possible to obtain a composite material having superior characteristics. The most part of the mode of the destruction of the structural member using CFRP is interlayer peeling. As a result, CFRP is required to have a large resistance to progression of interlayer peeling crack.

In view of this, an object of the present invention is to provide a composite material capable of fully exhibiting the effects of carbon nanotubes, a prepreg using the same, a carbon-fiber-reinforced molded article having larger resistance to progression of interlayer peeling crack, and a method for manufacturing the composite material.

Solution to Problem

A composite material in accordance with the present invention includes a carbon fiber bundle in which a plurality of continuous carbon fibers are arranged, carbon nanotubes adhering to respective surfaces of the carbon fibers, and a plurality of fixing resin parts partly fixing the carbon nanotubes on the surfaces of the carbon fibers, where the fixing resin parts cover 7% or more and 30% or less of the surfaces of the carbon fibers to which the carbon nanotubes adhere.

A prepreg in accordance with the present invention includes the above-described composite material and a matrix resin impregnated with the composite material.

A carbon-fiber-reinforced molded article in accordance with the present invention is made of a cured material of the above-described prepreg.

A method for manufacturing a composite material in accordance with the present invention includes the steps of, in a carbon fiber bundle in which a plurality of continuous carbon fibers are arranged, attaching carbon nanotubes to respective surfaces of carbon fibers in the plurality of continuous carbon fibers, and sizing the carbon fibers to which the carbon nanotubes adhere using a sizing agent of an emulsion type, and thereby forming fixing resin parts that fix the carbon nanotubes partly to the surfaces of the carbon fibers, the fixing resin parts covering 7% or more and 30% or less of the surfaces of the carbon fibers to which the carbon nanotubes adhere.

Advantageous Effects of Invention

The composite material of the present invention includes a bundle of carbon fibers to the surface of which CNTs adhere. Since the fixation of the CNTs on the surface of the carbon fibers is partial, at locations which are not fixed, the CNTs are allowed to be detached from the surface of the carbon fiber and raised. By virtue of the fact that there is CNTs in a free state where they are raised above the surface of the carbon fibers, the effects of the CNTs can be fully exhibited.

In the prepreg in which the composite material of the present invention is impregnated with the matrix resin, the CNTs raised from the carbon fibers are brought into direct contact with the matrix resin. In the carbon-fiber-reinforced molded article obtained by curing of such a prepreg, a CNT composite resin layer is formed in which the CNTs and the matrix resin are combined in the form of a composite element. By virtue of the fact that the CNT composite resin layer is provided, the resistance to progression of interlayer peeling crack of the carbon-fiber-reinforced molded article of the present invention can be enhanced.

DESCRIPTION OF EMBODIMENTS

Hereinafter, an embodiment of the present invention will be described in detail with reference to the drawings.

1. OVERALL CONFIGURATION

Figure 1:
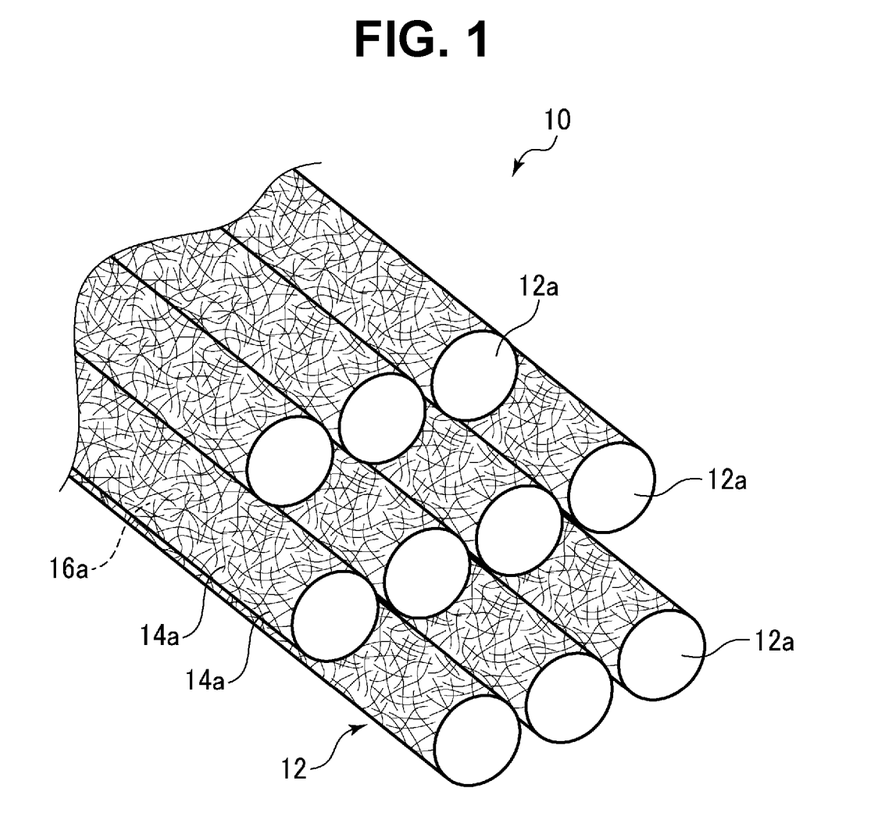
FIG. 1 is a partial schematic diagram illustrating the configuration of the composite material in accordance with this embodiment.

As depicted in FIG. 1, a composite material 10 of this embodiment includes a carbon fiber bundle 12 in which a plurality of continuous carbon fibers 12a are arranged. The diameter of the carbon fibers 12a is about 5 to 20 micrometers (μm). The carbon fibers 12a can be obtained by baking of organic fibers derived from fossil fuels and organic fibers derived from wood and plant fibers. While the figure depicts only 10 carbon fibers 12a for the sake of explanation, the carbon fiber bundle 12 in this embodiment can include 1,000 to 100,000 carbon fibers 12a.

CNTs 14a adhere to the surfaces of the respective carbon fibers 12a. The CNTs 14a are dispersed on the surface of the carbon fibers 12a and entangled with one another and are capable of thereby forming a network structure by being brought into direct contact with or directly connected to each other. It is preferable that there is no intervening material between the CNTs 14a such as dispersing agents such as surfactants, adhesives, etc.

The CNTs 14a adhere directly to the surface of the carbon fibers 12a. Connection in this context may include physical connection (simple contact). Also, adhesion in this context refers to bonding by Van Der Waals forces. Further, "direct contact or direct connection" may include a state where a plurality of CNTs are in simple contact with one another, in addition to which it may include a state where a plurality of CNTs are interconnected in an integral manner.

The CNTs 14a uniformly adhere to the surface of the carbon fibers 12a. Specifically, as will be described later with reference to the actual measurement examples, the uniformity can be evaluated using the following procedure. First, 12 frames of 1 μm square are set at equal intervals in a region of 21 μm in the length direction of the carbon fibers 12a. Subsequently, for each of these frames, the number of the carbon nanotubes intersecting any one side of the four sides of each frame is counted. Finally, the standard deviation based on the above counting result is determined. In the case of this embodiment, the standard deviation of the above-mentioned number is 5 or less.

It is preferable that the CNTs 14a have a length of 1 μm or more. The length of the CNTs 14a is the length of the carbon nanotubes observed when the above-mentioned uniformity was measured. Also, the length of the CNTs 14a may be determined based on an optical photomicrograph. When the length of the CNTs 14a is equal to or longer than 1 μm, then it will be easier for them to adhere uniformly to the individual surfaces of the carbon fibers 12a. The CNTs 14a may have a length of 3 μm or more. The state of adhesion of the CNTs 14a can be evaluated by observation by an SEM and visual inspection of the obtained image. It is preferable that at least 50% of the measured CNTs 14a have a length of 1 μm or more. It is preferable that the ratio of the CNTs 14a having the length of 1 μm or more is 70% or more, and it is most preferable that the ratio is 90% or more.

It is preferable that the CNTs 14a has an average diameter of about 30 nm or less. CNTs 14a having an average diameter of 30 nm or less are very flexible, and capable of creating a network structure on the surfaces of the carbon fibers 12a. The diameter of the CNTs 14a is an average diameter measured using a transmission electron microscope (TEM) photograph. It is more preferable that the CNTs 14a have an average diameter of about 20 nm or less.

Figure 2:
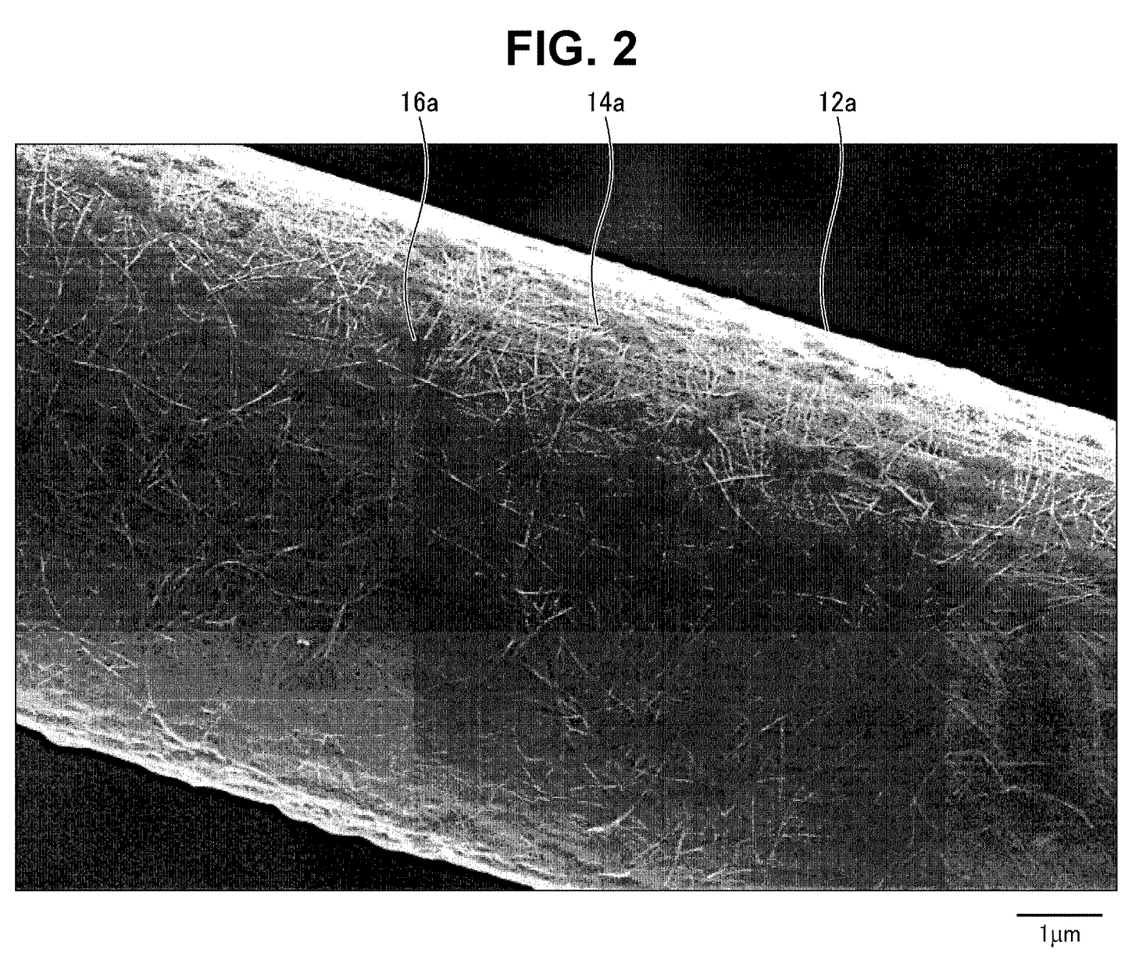
FIG. 2 is an SEM (scanning electron microscope) photograph of the surface of the carbon fiber in the composite material.

The plurality of CNTs 14a are partly fixed to the surface of the carbon fibers 12a by the plurality of fixing resin parts 16a. FIG. 2 provides an SEM photograph of the surface of the carbon fibers 12a in the composite material 10. A plurality of CNTs 14a adhere to the surface of the carbon fibers 12a. The black regions present in a scattered manner in the photograph correspond to the fixing resin parts 16a. The fixing resin part 16a is made of cured material obtained from reactive curing resin, thermosetting resin, or thermoplastic resin. As will be described later in detail, the fixing resin parts 16a is formed by performing sizing treatment with a sizing agent containing resin in the form of droplets with a particle size on the order of about 0.05 to 1 μm emulsion type.

Figure 3:
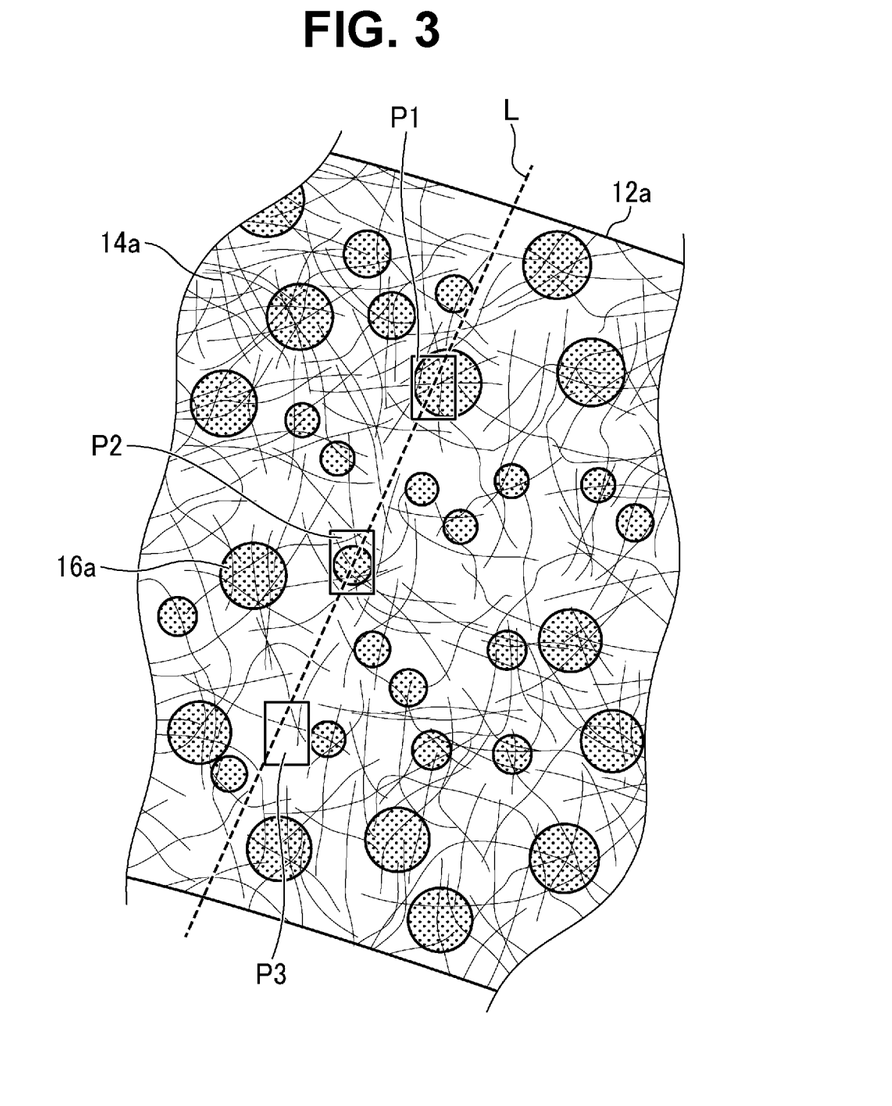
FIG. 3 is a schematic diagram illustrating part of the surface of the carbon fiber.

FIG. 3 schematically depicts part of the surface of the carbon fibers 12a illustrated in FIG. 2. The fixing resin parts 16a cover 7% or more and 30% or less of the surface of the carbon fibers 12a to which the CNTs 14a adhere. In this embodiment, the fixing resin parts 16a are present at a rate of 10 to 40 pieces per 5 μm square in the surface of the carbon fibers 12a to which the CNTs 14a adhere. All of the CNTs 14a adhering to the surfaces of the carbon fibers 12a are fixed to the carbon fibers 12a by the fixing resin parts 16a at a certain location in their individual lengths.

In the case where the area percentage of the fixing resin part 16a in the surface of the carbon fibers 12a is less than 7%, the CNTs 14a cannot be sufficiently fixed to the surface of the carbon fibers 12a, so that the CNTs 14a are peeled off from the surface of the carbon fibers 12a during producing of the prepreg. If the area percentage of the fixing resin part 16a exceeds 30%, the entirety of the CNTs 14a will be fixed to the carbon fibers 12a. Also, in the case where the area percentage of the fixing resin part 16a is 7% or more and 30% or less, when the number of pieces per 5 μm square is deviated from the above-mentioned range, the desired effect cannot be obtained. If the number of pieces is less than 10, then the fixing resin parts 16a having a large area will be sparsely arranged, which causes creation of CNTs 14a that are not at all fixed to the carbon fibers 12a. If the number of pieces exceeds 40, the area of the fixing resin part 16a per piece is too small, which makes it impossible for the CNTs 14a to be sufficiently fixed to the carbon fibers 12a. Any of the above-described cases will lead to decrease in the strength of the obtained carbon-fiber-reinforced molded article.

The substantial area per piece of the fixing resin parts 16a is on the order of about 0.03 to 1.12 μm². If the individual areas of the fixing resin parts 16a are lower than the lower threshold, the strength of adhesion is weak, making it impossible for the CNTs 14a to be sufficiently fixed to the surfaces of the carbon fibers 12a. In this case as well, in the same manner as described above, decrease in the strength of the obtained carbon-fiber-reinforced molded article will result. If the particle size of the resin in the form of droplets is 1 μm or less, then it is possible to avoid a situation where the CNTs 14a sink in the fixing resin parts 16a. If the particle size of the resin in the form of droplets e size is 0.05 µm or more, then the CNTs 14a can be fixed to the surface of the carbon fibers 12a. It is preferable that the particle size of the resin in the form of droplets is on the order of about 0.1 to 0.4 µm. In some cases, multiple resins in the form of droplets may be made into one piece on the surface of the carbon fiber, so that the upper threshold of the area of the fixing resin part 16a should be as discussed above.

If the length of the CNTs 14a is 1 µm or more, the CNTs 14a are present in such a manner that they extend to the outside of the fixing resin part 16a without being completely covered by the fixing resin parts 16a. For example, the total area of the fixing resin parts 16a in 5 µm square of the surfaces of the carbon fibers 12a is on the order of about 1.75 to 7.5 µm$^2$.

Figure 4:
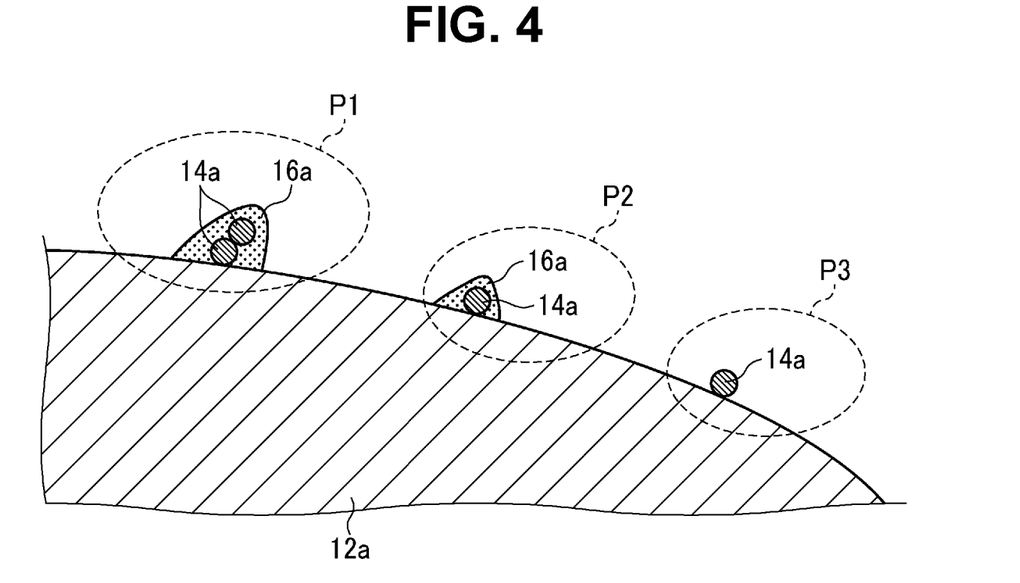
FIG. 4 is a schematic diagram of regions P1, P2, and P3 in the cross section taken along the line L of FIG. 3.

The state of the CNTs 14a in the surface of the carbon fibers 12a will be described with reference to FIG. 4. FIG. 4 is a schematic diagram of regions P1, P2, and P3 in the cross section taken along the line L in FIG. 3. At the region P1, two CNTs 14a adhering onto the carbon fibers 12a are covered by the fixing resin part 16a. At the region P2, one CNT 14a adhering onto the carbon fibers 12a is covered by the fixing resin part 16a. At the regions P1 and P2, the CNTs 14a are fixed in this manner to the carbon fibers 12a.

In the region P3, no fixing resin parts 16a as in the cases of the regions P1, P2 are present. The CNTs 14a in the region P3 are not fixed to the carbon fibers 12a and only adhere to the surface of the carbon fibers 12a by Van der Waals forces. As a result, the CNTs 14a in the region P3 can be detached from the surface of the carbon fibers 12a and raised. In this case as well, the CNTs 14a are fixed at a certain location in their lengths to the surfaces of the carbon fibers 12a by the fixing resin part 16a.

Figure 5:
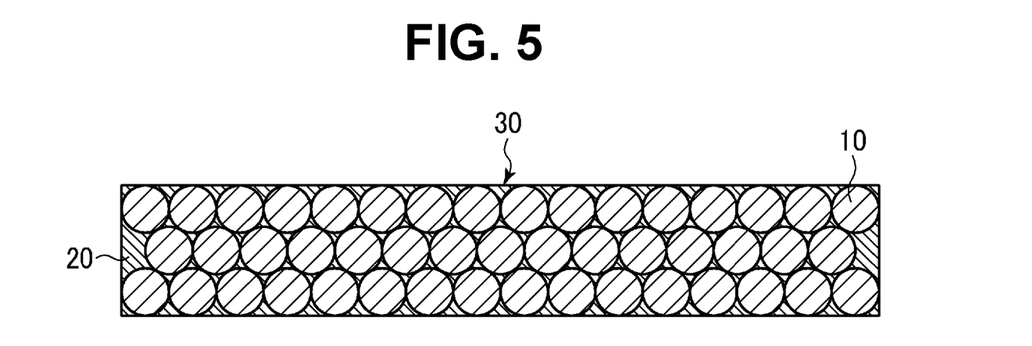
FIG. 5 is a longitudinal cross-sectional view of the prepreg in accordance with this embodiment viewed in a length direction.

As mentioned above, the CNTs 14a adhere to the surface of the carbon fibers 12a contained in the composite material 10 and, further, the fixing resin parts 16a are provided at a predetermined area percentage. FIG. 5 provides a longitudinal cross-sectional view of the prepreg of this embodiment including this composite material 10 viewed in its length direction. The prepreg 30 includes the composite material 10 of this embodiment and a matrix resin layer 20.

With regard to the matrix resin used in the matrix resin layer 20, thermosetting resin or thermoplastic resin can be used. With regard to the thermosetting resin, for example, epoxy resin, unsaturated polyester resin, vinyl ester resin, phenol resin, melamine resin, urea resin, cyanate ester resin, bismaleimide resin, and the like may be mentioned. With regard to the thermoplastic resin, for example, polyolefin resin, polyamide resin, polycarbonate resin, polyphenylene sulfide resin, and the like may be mentioned.

Figure 6:
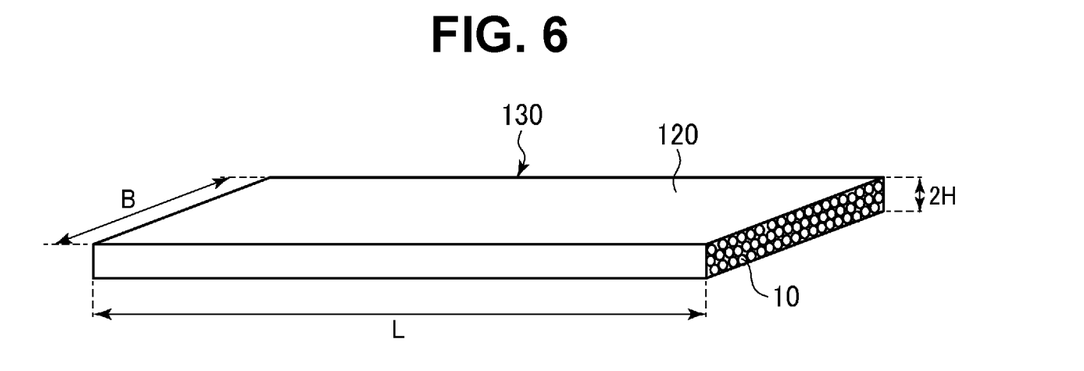
FIG. 6 is a perspective view of a carbon-fiber-reinforced molded article in accordance with this embodiment.

FIG. 6 is a perspective view of the carbon-fiber-reinforced molded article of this embodiment. Since the carbon-fiber-reinforced molded article 130 is a cured material of the prepreg 30, it includes a cured resin layer 120 resulting from the curing of the matrix resin layer 20 and a composite material 10. The carbon-fiber-reinforced molded article 130 is of carbon fiber reinforced plastic (CFRP). The carbon-fiber-reinforced molded article 130 may have any suitable dimensions according to the JIS standards relevant to the test being conducted.

2. MANUFACTURING METHOD

Next, a method for manufacturing the composite material 10, the prepreg 30, and the carbon-fiber-reinforced molded article 130 in accordance with this embodiment will be explained.

<Manufacturing of Composite Material>

The composite material 10 can be manufactured by immersing a carbon fiber bundle 12 containing a plurality of carbon fibers 12a in a CNT dispersion in which the CNTs 14a are isolated and dispersed (which may also be hereinafter referred to simply as a dispersion), to attach the CNTs 14a to the respective surfaces of the carbon fibers 12a, and then subjecting the carbon fiber bundle 12 to sizing treatment. Hereinafter, the respective steps will be explained in order.

(Preparation of Dispersion)

In the preparation of the dispersion, it is possible to use CNTs 14a manufactured in the following manner. The CNTs 14a can be created, for example, by forming a catalyst film composed of aluminum and iron on a silicon substrate using a thermal CVD method as described in Japanese Patent Application Laid-Open No. 2007-126311, micronizing the catalyst metal for CNT growth, and bringing the catalyst metal into contact with hydrocarbon gas in a heating atmosphere.

CNTs created by other methods such as arc discharge method and laser evaporation method may be used as long as the CNTs contain as few impurities as possible. Impurities can be removed by annealing the manufactured CNTs at high temperature in inert gas. The CNTs thus created has a high aspect ratio and linearity as they have a diameter of 30 nm or less and a length of several hundred micrometers to several millimeters. The CNTs may have either a single layer or multiple layers but preferably have multiple layers.

A dispersion in which the CNTs 14a are isolated and dispersed is prepared using the CNTs 14a that have been prepared as described above. Isolated dispersion means a state in which the CNTs 14a are physically separated one by one and dispersed in the dispersion medium without being entangled and the proportion of aggregates in which two or more CNTs 14a are gathered in a shape of a bundle is 10% or less.

Dispersion aims to make the dispersion of CNTs 14a uniform by using a homogenizer, shear force, an ultrasonic dispersion machine, etc. As the dispersion medium, it is possible to use water; alcohols such as ethanol, methanol, and isopropyl alcohol; and organic solvents such as toluene, acetone, tetrahydrofuran (THF), methyl ethyl ketone (MEK), hexane, normal hexane, ethyl ether, xylene, methyl acetate, ethyl acetate, etc.

For the preparation of the dispersion, additives such as dispersing agent and surfactant are not necessarily required, but such additives may be used within a range where they do not inhibit the functions of the carbon fibers 12a and the CNTs 14a.

(Adhesion of CNTs)

The carbon fiber bundle 12 is immersed in the dispersion that has been prepared in the above-described manner, and then mechanical energy is applied to the dispersion to attach the CNTs 14a to the surfaces of the carbon fibers 12a. As the mechanical energy, vibrations, ultrasonic waves, fluctuation, and the like may be mentioned. By application of the mechanical energy, a reversible reaction state is created in the dispersion, where a state in which the CNTs 14a are dispersed and a state in which they are aggregated always occur.

When the carbon fiber bundle 12 containing the plurality of continuous carbon fibers 12a are immersed in the dispersion placed in the reversible reaction state, then the reversible reaction state of the dispersion state and the aggregation state of the CNT 14a also occurs on the surfaces of the carbon fibers 12a. The CNTs 14a adhere to the surfaces of the carbon fibers 12a when the CNTs 14a exit the dispersion state and enter the aggregation state.

During aggregation, van der Waals forces act on the CNTs 14a and the CNTs 14a adhere to the surfaces of the carbon fibers 12a by the van der Waals forces. In this manner, a carbon fiber bundle (CNT-adhered carbon fiber bundle) is obtained with the CNTs 14a adhering to the respective surfaces of the carbon fibers 12a in the carbon fiber bundle 12. In this embodiment, during adhesion of the CNTs 14a, adjustment is performed such that the period of time of the equilibrium state becomes longer than in the conventional cases. By virtue of this, the uniformity of the adhesion of the CNTs 14a on the surfaces of the carbon fibers 12a can be increased.

(Sizing Treatment)

In the sizing treatment, a sizing agent of emulsion type is used. The sizing agent of emulsion type is a sizing agent containing resin in the form of droplets with a particle size of 0.05 to 1 µm. The particle size can be determined by laser analysis. With regard to the resin, for example, a reactive resin may be mentioned. The reactive resin is a resin having a functional group having high reactivity with a carboxyl group, specifically, a resin having an oxazoline group. With regard to the reactive resin emulsion, for example, Epocross™ (manufactured by Nippon Shokubai Co., Ltd.) may be mentioned. The Epocross has a concentration of the reactive resin on the order of about 40% by mass.

The sizing agent can be diluted with a solvent and used as sizing liquid. With regard to the solvent, for example, water, ethanol, acetone, MEK, N,N-dimethylformamide, N,N-dimethylacetamide, N-methylpyrrolidone, toluene, styrene, etc. may be mentioned. These solvents can be used alone or in combination of two or more of them. Resin concentration after the dilution is adjusted as appropriate such that the amount of adhesion of the sizing agent on the carbon fiber surface after drying becomes a predetermined amount.

With regard to the solvent, a water solvent is preferred in terms of handleability and safety. The concentration of the sizing agent in the sizing liquid should be timely changed according to the target amount of adhesion of the sizing agent. The amount of adhesion of the sizing agent on the carbon fiber surface after the drying is on the order of about 0.4 to 3% by mass, and preferably on the order of about 1% by mass.

The sizing treatment can be performed by applying the sizing liquid onto the CNT-adhered carbon fiber bundle and then performing drying to cure the resin. With regard to the method of application of the sizing liquid, for example, roller dipping and roller contact methods or the like may be mentioned. The amount of adhesion of the sizing agent on the carbon fiber surface can be adjusted by sizing liquid concentration tuning and metering adjustment. With regard to the means for drying, for example, hot air, hot plate, heating roller, various infrared heaters, etc. may be mentioned.

The composite material 10 of this embodiment is obtained by subjecting the CNT-adhered carbon fiber bundle to the sizing treatment using the sizing agent of emulsion type. In the composite material 10, 7% or more and 30% or less of the surface of the carbon fibers 12a to which the CNTs 14a adhere is covered by a plurality of fixing resin parts 16a.

In this embodiment, a sizing agent of emulsion type containing resin in droplets with a particle size of 0.1 to 0.4 µm is used. As discussed above, if the particle size of the resin in the form of droplets is 1 µm or less, then the resin is allowed to reside between the CNTs 14a adhering to the surface of the carbon fibers 12a and forming a network structure. In this manner, the fixing resin parts 16a each having an area on the order of about 0.03 to 1.12 µm² are formed.

The area of the fixing resin parts 16a varies depending on the particle size of the droplets in the emulsion. The sizing agent in use is diluted as appropriate. In the case the sizing liquid is used which has been adjusted such that the amount of adhesion of the sizing agent on the carbon fiber surfaces after the drying becomes about 0.4 to 3% by mass, the number of the fixing resin parts 16a per 5 µm square of the surfaces of the carbon fibers 12a will be 10 to 40. The number of the fixing resin parts 16a per unit area varies, for example, depending on the concentration of the resin in the sizing liquid.

<Producing of Prepreg>

The prepreg 30 of this embodiment can be produced by impregnating the matrix resin with the composite material 10. The prepreg 30 can be produced, for example, by a wet method. In the case of the wet method, the matrix resin is dissolved in a solvent such as MEK and methanol to prepare a matrix resin solvent with low viscosity, which is impregnated with the composite material 10. After that, the composite material 10 is taken out of the matrix resin solvent, the solvent is made to evaporate by an oven or the like, and the prepreg 30 is thus obtained.

The prepreg 30 may be manufactured by a hot melt method. According to the hot melt method, the matrix resin is heated to lower its viscosity and impregnated with the composite material 10. Specifically, a resin film is used which has been created by coating exfoliate paper or the like with the matrix resin. A resin film or films are place on both sides or either side of the composite material 10 to apply heat and pressure thereto, and the matrix resin is impregnated with the composite material 10. According to the hot melt method, the prepreg 30 can be obtained without solvent residues.

<Manufacturing of Carbon-Fiber-Reinforced Molded Article>

In order to obtain the carbon-fiber-reinforced molded article 130 of this embodiment, for example, the prepreg 30 is cut to a predetermined length and lamination is performed as required and a laminated body is created. The carbon-fiber-reinforced molded article 130 can be produced by imparting pressure to this laminated body and heating and curing the matrix resin. The method of applying heat and pressure can be selected from press molding, autoclave molding, bagging molding, wrapping tape technique, an internal pressure molding, and the like.

3. OPERATIONS AND EFFECTS

The composite material 10 in accordance with this embodiment is constituted by a bundle of carbon fibers 12a (carbon fiber bundle 12) having CNTs 14a adhering to its surface and further including a plurality of fixing resin parts 16a. 7% or more and 30% or less of the surface of the carbon fibers 12a to which the CNTs 14a adhere is covered by a plurality of fixing resin parts 16a. As depicted in FIGS. 3 and 4 as the regions P1 and P2, the CNTs 14a are partly fixed to the surface of the carbon fibers 12a by means of the fixing resin parts 16a. As a result, the CNTs 14a do not peel off from the surfaces of the carbon fibers 12a.

The CNTs 14a have locations that are not fixed to the surface of the carbon fibers 12a (for example, the region P3 in FIGS. 3 and 4). The CNTs 14a in the region P3 adhere to the surface of the carbon fibers 12a by Van der Waals forces without any fixing resin part 16a, so that they can be detached from the surface of the carbon fibers 12a and raised. Since the CNTs 14a in this case are in a free state, the effects which will be described below will be obtained.

Figure 7:
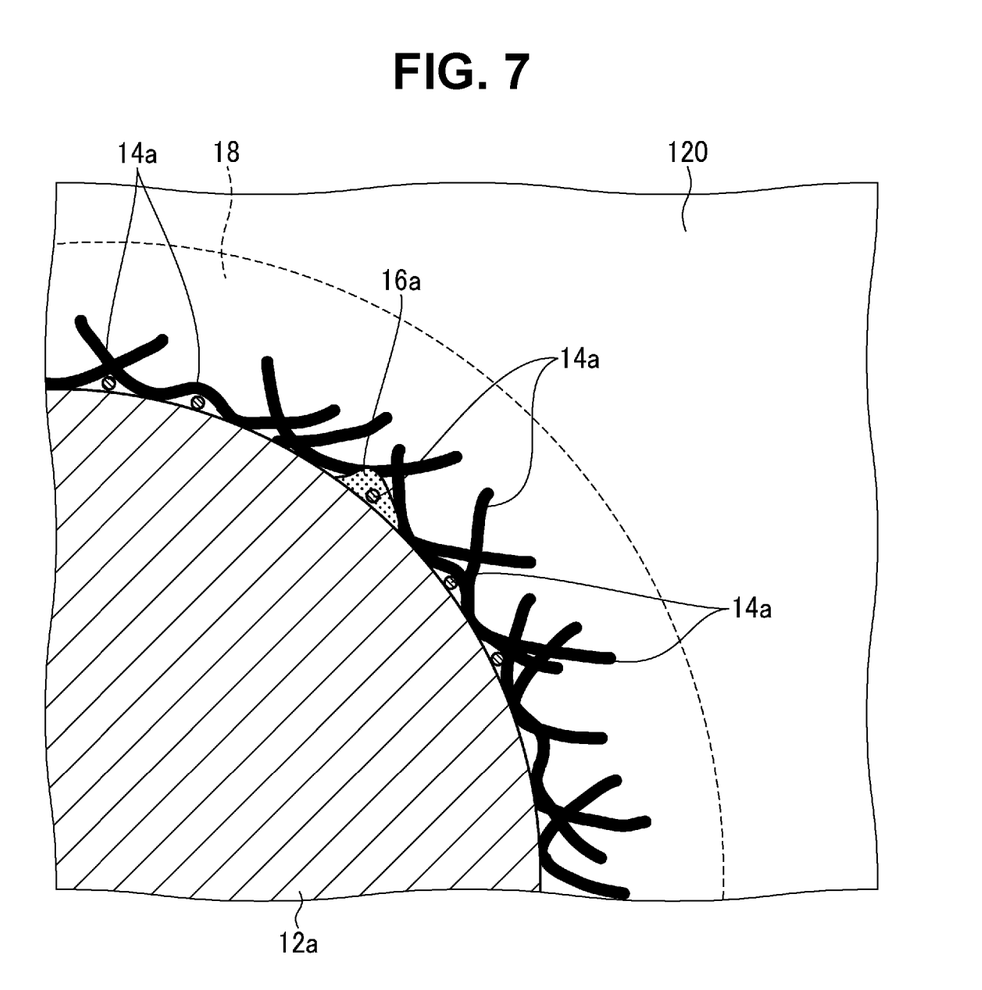
FIG. 7 is a schematic diagram illustrating a CNT composite resin layer.

Specifically, in the prepreg 30 in which the matrix resin is impregnated with the composite material 10, the CNTs 14a that have raised from the surface of the carbon fibers 12a are brought into direct contact with the matrix resin layer 20. In a molded article 130 made by curing of such a prepreg 30, as illustrated in FIG. 7, the CNT composite resin layer 18 is formed at the interface between the cured resin layer 120 and the carbon fibers 12a. The CNTs 14a in the CNT composite resin layer 18 are present at a high concentration on the side of the carbon fibers 12a. The concentration of the CNTs 14a gradually decreases according to increase in the distance from the carbon fibers 12a.

In the CNT composite resin layer 18, the CNTs 14a and the matrix resin are combined in the form of a composite element, as a result of which the CNT composite resin layer 18 has enhanced strength and flexibility which derive from the CNTs 14a. The CNT composite resin layer 18 also has the effect of relieving stress concentration. In addition, since the CNTs 14a are partly fixed to the surface of the carbon fibers 12a by the fixing resin part 16a, the remaining portions of the CNTs 14a are combined with the matrix resin in the form of a composite element, so that the adhesive strength between the carbon fibers 12a and the cured resin layer 120 is improved.

This CNT composite resin layer 18 suppresses progression of interlayer peeling in the carbon-fiber-reinforced molded article 130. By virtue of this, the carbon-fiber-reinforced molded article 130 in accordance with this embodiment will have a larger aperture mode interlaminar fracture toughness value ($G_{IR}$) in the process of the crack progression.

As mentioned above, in the composite material 10 in accordance with this embodiment, the CNTs 14a uniformly adhere to the surface of the carbon fibers 12a. This fact also is a factor that increases the $G_{IR}$. For example, if there is a region which has an extremely small amount of the adhered CNTs 14a, then there is a small amount of CNTs 14a which are partly fixed to the surface of the carbon fibers 12a, so that the effect of the CNT composite resin layer 18 will also become insufficient. In this embodiment, by virtue of the fact that the CNTs 14a uniformly adhere to the surface of the carbon fibers 12a, the effect of the CNT composite resin layer 18 can be more reliably obtained.

4. EXAMPLES

The present invention will be described with reference to examples, but the present invention is not limited to the following examples.

The composite material of the example was created by the procedure described in the above-described manufacturing method. As the CNTs 14a, multi-walled carbon nanotubes MW-CNT grown to a diameter of 10 to 15 nm and a length of 100 μm or more on a silicon substrate by thermal CVD were used.

The CNTs 14a were washed with a 3:1 mixed acid of sulfuric acid and nitric acid to remove catalyst residues and then filtered and dried. The CNTs 14a were added to an MEK as a dispersion medium and the dispersion was prepared. The CNTs 14a were crushed using an ultrasonic homogenizer and cut to a length of about 3 μm. The concentration of CNTs 14a in the dispersion was set to 0.01 t % by weight. This dispersion does not contain a dispersing agent or an adhesive agent.

Subsequently, carbon fiber bundle 12 was input to the dispersion while ultrasonic vibrations of 28 kHz and 40 kHz were applied to the dispersion. As the carbon fiber bundle 12, T700SC-12000 (manufactured by Toray Industries, Inc.) was used. In the carbon fiber bundle 12, 12,000 carbon fibers 12a are contained. The diameter of the carbon fibers 12a is about 7 μm and the length is about 100 m. The carbon fiber bundle 12 was kept in the dispersion for ten seconds. As described above, during the adhesion, adjustment was performed such that the period of time of the equilibrium state becomes longer than in conventional cases. In this manner, the CNT-adhered carbon fiber bundle was obtained.

Figure 8:
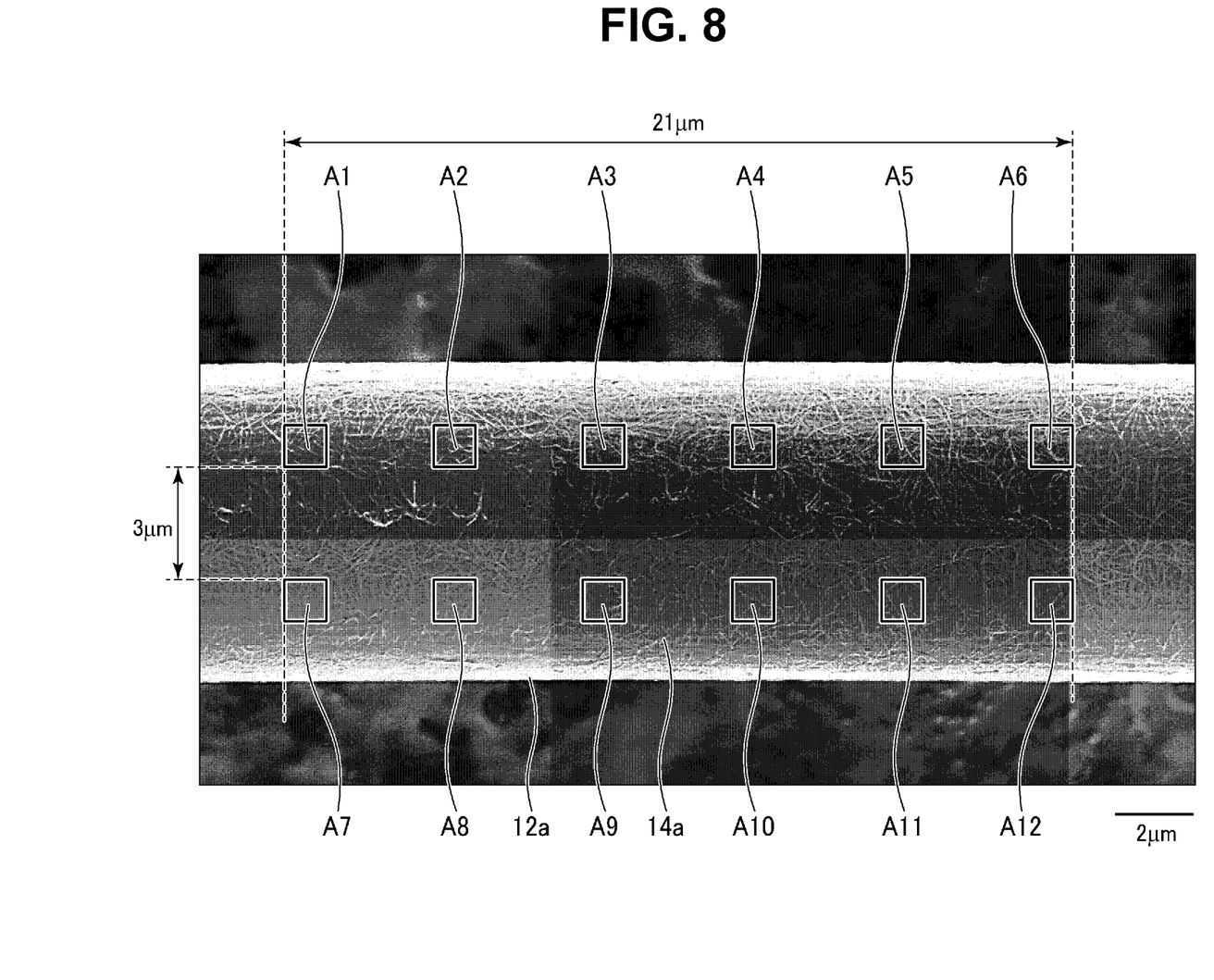
FIG. 8 is an SEM photograph of the surface of the carbon fiber in the CNT-adhered carbon fiber bundle.

FIG. 8 provides an SEM photograph of part of the surface of the carbon fibers contained in the CNT-adhered carbon fiber bundle. A plurality of CNTs 14a adhere to the surface of the carbon fibers 12a uniformly in the radial direction and the length direction. The result of evaluation of the uniformity of adhesion of the CNTs 14a is explained below. First, as illustrated in FIG. 8, in a region of 21 μm in the length direction of the carbon fibers 12a, multiple frames of 1 μm square were set at equal intervals. The shortest distance between two adjacent frames was set to 3 μm.

The frames depicted in FIG. 8 are set such that they are arranged uniformly in the length direction of the carbon fibers 12a, but the mode of arrangement is not limited to this. The frames can be set according to any suitable mode of arrangement as long as they are uniformly arranged from the center line toward the both sides in the radial direction of the carbon fibers 12a. Here, although the number of the frames is 12, any appropriate number of frames can be set if the above-described condition is met.

For each frame, the length and the number of pieces of the CNTs 14a intersecting any one of the four sides were measured and counted. About 30% of the measured CNTs 14a had a length of less than 1 μm. If the shortest distance between two adjacent frames is shorter than the length of the CNTs 14a, then it follows that some CNTs 14a may exist that intersect the sides of the frames at two or more locations. The number of the CNTs 14a intersecting one side out of the four sides of the frame is counted as one piece on a per-side basis, so that, in this case, the number of the CNTs 14a intersecting the side is 2. Likewise, with regard to a CNT 14a intersecting two sides of one frame, it is counted as two CNTs. The number of pieces measured on each side is summarized in the following Table 1.

TABLE 1

| Region | A1 | A2 | A3 | A4 | A5 | A6 | A7 | A8 | A9 | A10 | A11 | A12 |
|---|---|---|---|---|---|---|---|---|---|---|---|---|
| CNT No. of pcs | 28 | 26 | 26 | 28 | 27 | 25 | 22 | 20 | 30 | 37 | 25 | 23 |

Based on the measurement results, the average and the standard deviation of the number of the CNTs intersecting one side of each frame were calculated as 26.42 and 4.15, respectively. If the standard deviation of the number of pieces determined in this manner is equal to or smaller than 5, the CNTs adhere uniformly to the substantially entire surfaces of the carbon fibers. Since the CNTs 14a were attached to the surface of the carbon fibers 12a by the above-described manner, the uniformity of adhesion of the CNTs was enhanced.

The CNT-adhered carbon fiber bundle was subjected to the sizing treatment and dried on a hot plate of about 80° C. In this manner, the composite material 10 of the example was obtained. The sizing agent that was used is Epocross™ (manufactured by Nippon Shokubai Co., Ltd.). The sizing agent contains therein reactive resin in the form of droplets with the particle size on the order of about 0.1 to 0.4 μm. The sizing agent was diluted by deionized water and then used such that the amount of adhesion on the carbon fiber surface after the drying is on the order of about 1% by mass.

Figure 9:
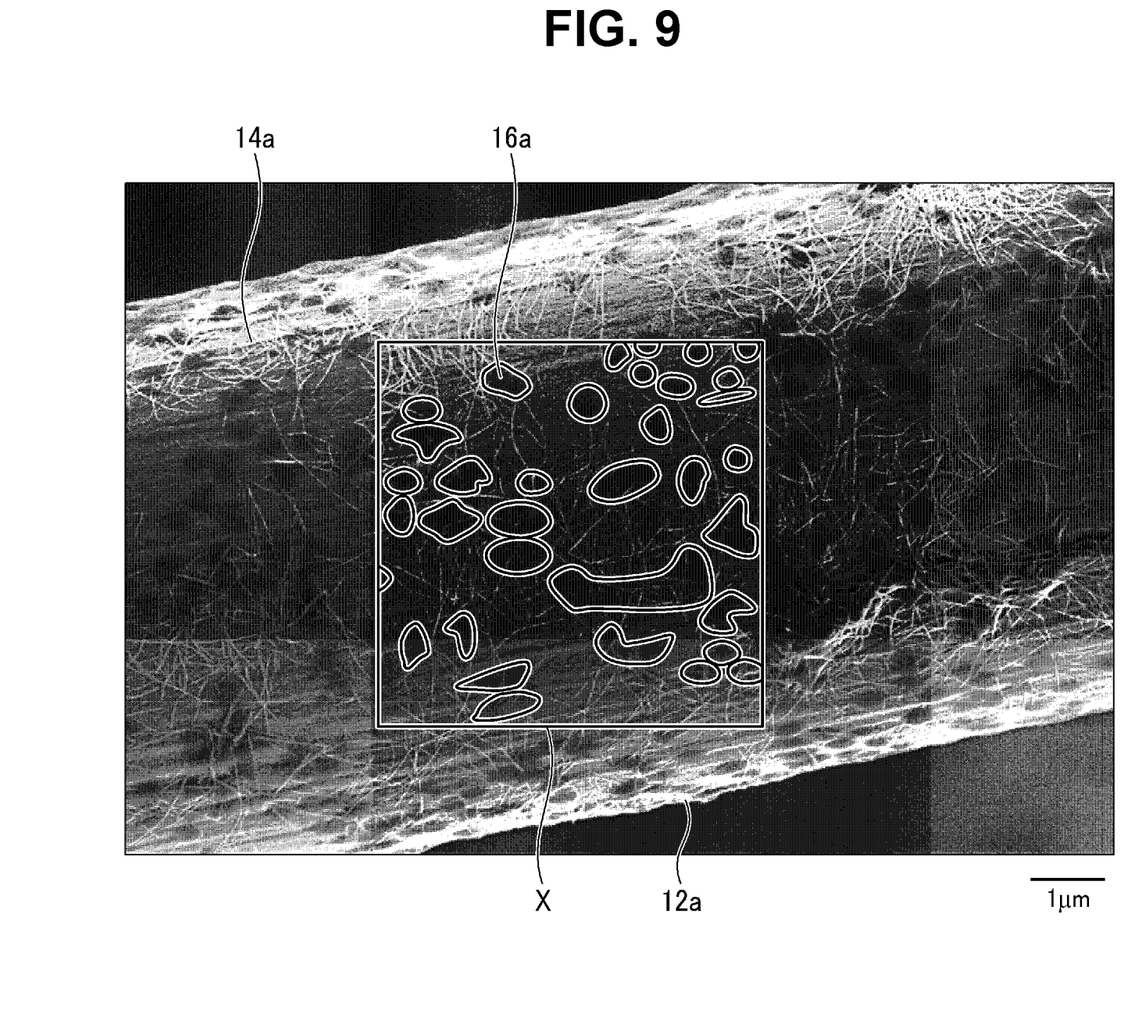
FIG. 9 is an SEM photograph illustrating an area percentage of the fixing resin parts on the surface of the composite material of the example.

The area percentage of the fixing resin parts 16a on the surface of the composite material 10 of the example will be described with reference to the SEM photograph of FIG. 9. As illustrated in FIG. 9, a region X of 5 μm square is defined in the surface of the carbon fibers 12a to which the CNTs 14a adhere, and the number of the fixing resin parts 16a residing within this region X and the area of each fixing resin part 16a are determined using Winroof2015 (manufactured by Mitani Corporation). Here, the number of the fixing resin parts 16a is 35. The areas of the individual fixing resin parts 16a that were confirmed is 0.03 to 1.12 μm². With regard to the region X in the composite material 10, 27% of the area of 25 μm² is covered by the fixing resin parts 16a.

In order to study the tendency of the number of the fixing resin parts and the area percentage, samples of five types differing from one another in the amount of adhesion of the sizing agent were created. Conditions other than the dilution rate of the sizing agent such as the CNT-adhered carbon fiber bundle and the treatment condition were the same as those that have been discussed in the foregoing. For the samples obtained, a region of 5 μm square similar to that of the case of FIG. 9 was defined, and the number of the fixing resin parts residing within each region and the areas of each fixing resin part were measured in the same manner.

Figure 10:
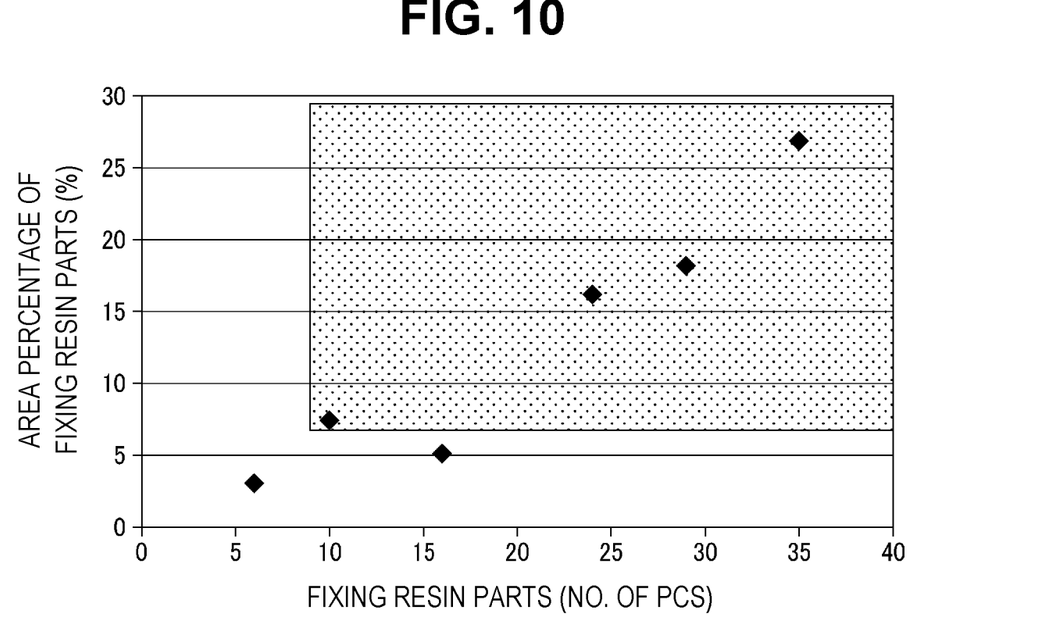
FIG. 10 is a graph illustrating the number of the fixing resin parts and the area percentage of the fixing resin parts.

The number of the fixing resin parts in each region and the area percentage of the fixing resin parts were plotted in the graph of FIG. 10. It is preferable that 7% or more and 30% or less of a region within 5 μm square of the surfaces of the carbon fibers 12a to which the CNTs 14a adhere is accounted for by the fixing resin parts 16a. It is preferable that the number of the fixing resin parts 16a residing in a region within 5 μm square of the surfaces of the carbon fibers 12a to which the CNTs 14a adhere is 10 to 40.

By using the composite material 10, a prepreg 30 as illustrated in FIG. 5 was created. The composite materials 10 were pulled in one direction and aligned, and made into a carbon fiber sheet (fiber weight: 125 g/m²). The epoxy resin as the matrix resin was applied on the exfoliate paper using a knife coater and thereby a resin film was created. The resin content was set to 30% by mass. The aforementioned carbon fiber sheet was sandwiched by two resin films and heat and pressure were applied thereto by heat roll at 130° C. and 4 atm. The matrix resin is impregnated with the composite material 10 and thus a prepreg 30 of the example having a matrix resin layer 20 was obtained.

The obtained prepreg was cut and laminated such that a predetermined dimension is obtained. Heat and pressure were applied to the obtained laminated body by autoclave to cure the matrix resin and, thereby a carbon-fiber-reinforced molded article 130 of the example as illustrated in FIG. 6 was obtained. The carbon-fiber-reinforced molded article 130 was tuned to the size in accordance with the JIS standard.

A composite material of a comparative example was created by the same method as described above except that ARE-ST-13 (manufactured by ADVANCED RESIN LABO-LATORYS) was used as the sizing agent. The sizing agent used here is not of an emulsion type. The composite material of the comparative example was SEM-observed. It was confirmed that the surface of the carbon fibers to which CNTs adhere is covered uniformly by the resin-cured material.

A prepreg of a comparative example was created by the same method as that of the example and using the composite material of the comparative example. Further, by using the obtained prepreg, a carbon-fiber-reinforced molded article of the comparative example was created by the same method as that of the example.

<Evaluation of Interlaminar Fracture Toughness Value>

The carbon-fiber-reinforced molded article of the example and the carbon-fiber-reinforced molded article of the comparative example were used as the test pieces of the interlaminar fracture toughness mode I and the interlaminar fracture toughness values were measured. The interlaminar fracture toughness test was conducted using AUTOGRAPH AGX-V Series Precision Universal Testing Machine AG5-5kNX (manufactured by Shimadzu Corporation) on two each of the test pieces in accordance with JIS K7086.

As a test method, a double cantilever beam interlaminar fracture toughness test method (DCB method) was used. First, a precrack (initial crack) was made to occur at a point 2 to 5 mm away from the tip of the test piece, and, after that, the crack was made to further develop. The test was terminated at the time point at which the length of the progression of the crack reached 60 mm from the tip of the precrack. The cross head speed of the testing machine was changed according to the level of the crack progression. Specifically, the cross head speed until the level of the crack progression reaches 20 mm was set to 0.5 mm/min. When the level of the crack progression exceeded 20 mm, the cross head speed was set to 1 mm/min. The length of the crack progression was measured from both end faces of the test piece using a microscope, and the load, and the crack aperture displacement were measured and thereby the interlaminar fracture toughness value ($G_{IC}$) was calculated.

Figure 11:
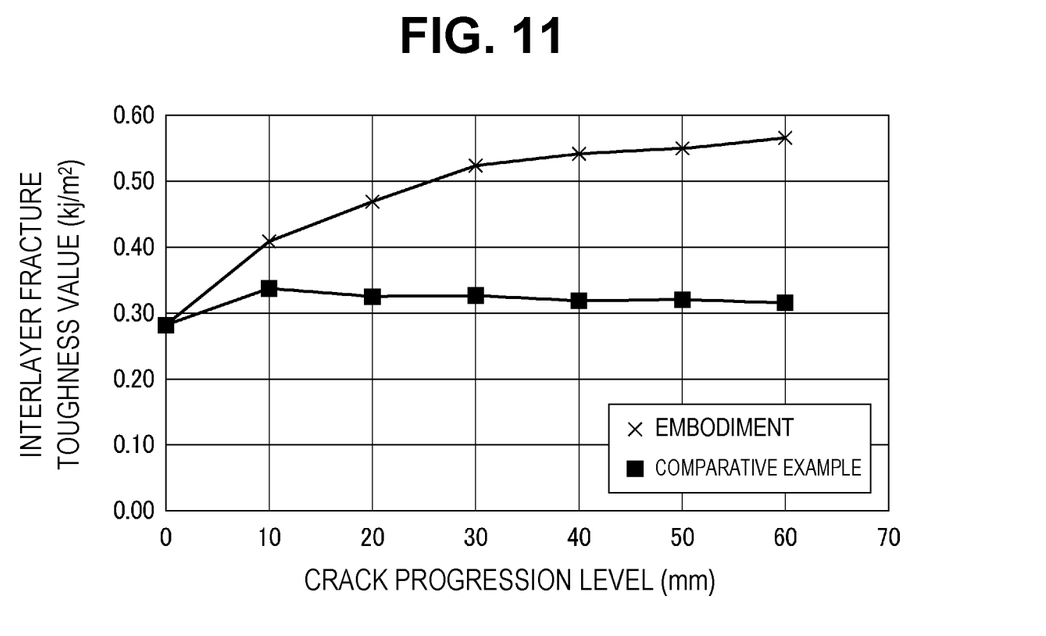
FIG. 11 is a graph illustrating the change in the interlaminar fracture toughness value due to progression of crack.

Change in the interlaminar fracture toughness value due to the progression of the crack is shown in the graph of FIG. 11. The interlaminar fracture toughness value was determined from the load-COD (Crack Opening Displacement) curve. With regard to the carbon-fiber-reinforced molded articles of the example and the comparative example, the average of the interlaminar fracture toughness values in the level of crack progression of 20 to 60 mm was adopted as the $G_{IR}$. The $G_{IR}$ of the carbon-fiber-reinforced molded article of the example is 0.53 kJ/m². In the case of the carbon-fiber-reinforced molded article of the comparative example, the $G_{IR}$ is 0.32 kJ/m².

In the carbon-fiber-reinforced molded article of the example, resistance to the progression of interlayer peeling crack is larger than the carbon-fiber-reinforced molded article of the comparative example, and the $G_{IR}$ is increased by about 60%. In the carbon-fiber-reinforced molded article of the example, a composite material is used in which CNTs are partly fixed to the surface of the carbon fibers by the fixing resin parts. It is presumed that, by using such a composite material, a CNT composite resin layer is formed in the molded article of the example, by virtue of which the progression of the interlayer peeling crack was suppressed.

5. MODIFIED EXAMPLE

The present invention is not limited to the above-described embodiment and can be modified as appropriate within the range of the purport of the present invention.

The resin contained in the sizing agent of emulsion type may be thermosetting resin or thermoplastic resin. With regard to the sizing agent of emulsion type containing such resin, for example, epoxy resin emulsion, acrylic resin emulsion, and urethane resin emulsion may be mentioned.

Two or more types of sizing agent can be used in combination. Also, in order to increase handleability of the carbon fibers, resistance to scratches, resistance to fuzz formation, and ease of impregnation, auxiliary components such as dispersing agent and surfactants may be added to the sizing agent.

REFERENCE SIGNS LIST

10: composite material
12: carbon fiber bundle
12a: carbon fiber
14a: carbon nanotubes (CNT)
16a: fixing resin part
18: CNT composite resin layer
20: matrix resin layer
30: prepreg
120: cured resin layer
130: carbon-fiber-reinforced molded article

The invention claimed is:

1. A composite material comprising:
a carbon fiber bundle in which a plurality of continuous carbon fibers are arranged;
carbon nanotubes adhering to respective surfaces of the carbon fibers, wherein at least 50% of the carbon nanotubes intersecting any one of four sides of a frame of 1 μm square in a region of 21 μm in a length direction of the carbon fiber has a length of 1 μm or more, and a standard deviation of the number of the carbon nanotubes intersecting any one of four sides of a frame of 1 μm square in a region of 21 μm is 5 or less; and
a plurality of fixing resin parts partly fixing the carbon nanotubes on the surfaces of the carbon fibers, wherein the fixing resin parts cover 7% or more and 30% or less of the surfaces of the carbon fibers to which the carbon nanotubes adhere.

2. The composite material according to claim 1, wherein the fixing resin parts are provided at a rate of 10 to 40 pieces per 5 μm square on the surfaces to which the carbon nanotubes adhere.

3. The composite material according to claim 1, wherein the fixing resin part is a cured material of reactive curing resin, thermosetting resin, or thermoplastic resin.

4. A prepreg comprising:
the composite material according to claim 1; and
a matrix resin impregnated with the composite material.

5. A carbon-fiber-reinforced molded article comprising a cured material of the prepreg according to claim 4.

6. A method for manufacturing a composite material, the method comprising:
in a carbon fiber bundle in which a plurality of continuous carbon fibers are arranged, attaching carbon nanotubes to respective surfaces of carbon fibers in the plurality of continuous carbon fibers, wherein at least 50% of the carbon nanotubes intersecting any one of four sides of a frame of 1 μm square in a region of 21 μm in a length direction of the carbon fiber has a length of 1 μm or more, and a standard deviation of the number of the carbon nanotubes intersecting any one of four sides of a frame of 1 μm square in a region of 21 μm is 5 or less; and
sizing the carbon fibers to which the carbon nanotubes adhere using a sizing agent, being an emulsion, and thereby forming fixing resin parts that fix the carbon nanotubes partly to the surfaces of the carbon fibers, the fixing resin parts covering 7% or more and 30% or less of the surfaces of the carbon fibers to which the carbon nanotubes adhere.

* * * * *